United States Patent [19]

Ozari et al.

[11] Patent Number: 5,374,482
[45] Date of Patent: Dec. 20, 1994

[54] MASKING TAPE

[75] Inventors: Yehuda Ozari, Greenwich, Conn.; Lalit Kochar, Pelham; Vance Hall, Jamaica, both of N.Y.; Ramesh Lhila, Newington, Conn.

[73] Assignee: TTI, New Rochelle, N.Y.

[21] Appl. No.: 984,656

[22] Filed: Dec. 2, 1992

[51] Int. Cl.⁵ .............................. B32B 7/12
[52] U.S. Cl. .................... 428/343; 428/323; 428/355
[58] Field of Search ............ 428/343, 350, 351, 355, 428/327, 323

[56] References Cited

U.S. PATENT DOCUMENTS

| | | | |
|---|---|---|---|
| 3,396,837 | 8/1968 | Schmelzle | 428/355 X |
| 3,870,593 | 3/1975 | Elton et al. | 428/343 X |
| 3,993,826 | 11/1976 | Butler et al. | 428/343 X |
| 4,237,889 | 12/1980 | Gobran | 428/343 X |
| 4,781,957 | 11/1988 | Brown et al. | 428/343 X |
| 4,898,762 | 2/1990 | Brown et al. | 428/343 X |
| 5,096,761 | 3/1992 | Roberts et al. | 428/343 X |
| 5,162,150 | 11/1992 | Buis et al. | 428/343 |
| 5,190,816 | 3/1993 | Gardiner et al. | 428/343 |

Primary Examiner—Daniel R. Zirker
Attorney, Agent, or Firm—Sprung Horn Kramer & Woods

[57] ABSTRACT

A hand-tearable masking tape comprising a tearable backing and an adherable face which permits the tape to be readily removable from a surface to which the tape is applied, the backing comprising a plastic film containing sufficient filler to bring the Elmendorf tear strength of the film to between about 150 and 300 gms.

3 Claims, No Drawings

MASKING TAPE

The invention relates to a novel masking tape which is easier and less expensive to produce than conventional masking tapes and which possesses certain advantages thereover.

BACKGROUND OF THE INVENTION

Masking tapes are used in painting, lacquering and the like, to protect an area from being treated, i.e. to establish a clear line of demarcation between two areas. For example, in repainting a portion of an automobile, a masking tape would be used to protect an area not to be repainted.

Masking tapes have a backing and an adhesive face. The adhesive face is of limited adhesion so that the tape can readily be removed from the surface to be protected after the operation is complete. The backing is generally paper, usually slightly creped to provide some stretch as might be needed in establishing a curved line of protection.

The backing is usually hand-tearable since the tape is sold in rolls and the user finds it easier simply to tear the tape off the roll cross-wise to the needed length.

For the desired tearability and/or adhesion it has been found necessary first to saturate the paper backing, e.g. with a styrene-butadiene copolymer, then to dry and apply the adhesive layer. The saturation serves to protect against mildew and possible water damage, to prevent paints from penetrating through the porous paper and prevents tape delamination.

The tape is made in wide width and rolled up, being cut into narrow widths, as desired, either before or after rolling up, possibly with additional steps of re-rolling.

OBJECT OF THE INVENTION

While such tapes are reasonable in price and perform adequately, it is an object of the invention to produce less expensively a masking tape which will perform even better.

BRIEF DESCRIPTION OF THE INVENTION

This object is realized in accordance with the invention pursuant to which there is provided a masking tape wherein the conventional impregnated paper backing is replaced by a plastic film which contains sufficient filler to bring the Elmendorf tear strength to from about 150 to 300 gm, i.e. to render it hand tearable.

On the other hand, the tape should still have a tensile strength of at least about 1400 psi (100 Kg/cm$^2$) to permit it to be wound during making and pulled by the user without unintended tearing.

DETAILED DESCRIPTION OF THE INVENTION

Advantageously the plastic film can be formed of any inexpensive polymer such as polyolefin, polyvinyl chloride, polyester, nylon, cellulose acetate, and the like. However for cost and performance polyolefins, especially polyethylene and polypropylene, more particularly low density polyethylene, have proven especially satisfactory.

Even if not perfectly transparent when filled and coated on one face with the adhesive, the resulting films are translucent so the user can see what lies below the applied tape, not possible with present tapes. Moreover such transluscency eliminates gloss and also permits easy writing and printing on the tape.

Whereas when one adds a filler to a film-former the object is usually to minimize strength loss of the resulting film, in the present invention the filler intentionally must substantially reduce the film strength since it usually will not be capable of transverse tearing by hand.

The precise amount of filler needed for this purpose will therefore depend upon the composition of the film, its thickness, other materials present such as plasticizer, and the like.

For polyethylene films of about 0.05 to 0.15 mm in thickness, about 25 to 60% and preferably about 40 to 50% by weight of filler, based on polyethylene, has proven adequate. Suitable fillers comprise inorganics such as calcium carbonate, calcium sulphate, magnesium salts, kaolin, sand, and the like, but organics such as sawdust, starch, cornmeal, ground plastic waste, and the like, can also be used. Its particle size can vary widely, about 0.5 to 10 and particularly about 1 to 4 microns being preferred.

Some fillers, such as diatomaceous earth, perform exceptionally well, much better for example than barytes.

There may also be included other agents for coloring or other properties and/or the fillers themselves may be colored.

The film-forming polymer usually in the conventional form of chips is compounded with the filler and extruded into film in conventional manner. To the film there is then applied the adhesive face, of conventional composition and in conventional manner.

Such adhesives can be any now employed, e.g. water or solvent based acrylic adhesive, natural rubber or synthetic rubber—resin based adhesives, applied from water, solvent or a hot melt medium.

The adhesive is generally applied in from about 15 to 65 and preferably about 15 to 30 grams/m$^2$ and the tape is thereafter converted to rolls of predetermined lengths and widths, possibly with intermediate rewindings and cuttings in width and length.

Even without pretreatment the novel films and tapes resist mildew and are essentially water-proof. Also they do not delaminate and paints will not penetrate.

The invention will be further described with reference to the following illustrative example where all parts are by weight unless otherwise expressed.

EXAMPLE

Low density polyethylene pellets of about 4 micron diameter are mixed and blended with 50% their weight of diatamaceous earth filler powder of about 3.5 micron diameter, and the blend is extruded into a film of 50 microns in thickness and 1.5 meters in width.

To one face of the film there is applied a water-based acrylic latex adhesive, Rhoplex 83D, in a weight of 23 grams per square meter.

The film is cooled to set the adhesive and then rolled up. Thereafter it is cut into lengths of 60 meters and widths of 25 mm.

It will be appreciated that the instant specification and claims are set forth by way of illustration and not limitation, and that various modifications and changes may be made without departing from the spirit and scope of the present invention.

What is claimed is:

1. In a hand-tearable masking tape comprising a tearable backing and an adherable face which permits the tape to be readily removable from a surface to which the tape is applied, the improvement which comprises employing as the backing a polyethylene film containing sufficient diatomaceous earth as filler to bring the Elmendorf tear strength of the film to between about 150 to 300 gm, the film being translucent and having a tensile strength of at least about 100 kg/cm².

2. A tape according to claim 1, wherein the diatomaceous earth is present in about 25 to 60% the weight of the polyethylene in the backing.

3. In the painting of a selected area of a surface while protecting another area of said surface from receiving paint by covering such other area with a masking tape, the improvement which comprises employing as said masking tape a tape according to claim 1.

* * * * *

UNITED STATES PATENT AND TRADEMARK OFFICE
CERTIFICATE OF CORRECTION

PATENT NO. : 5,374,482
DATED : December 20, 1994
INVENTOR(S) : Y. Ozari et al.

It is certified that error appears in the above-indentified patent and that said Letters Patent is hereby corrected as shown below:

Title page [56] U.S.          Insert
U.S. Patent Docu-             --4,751,121 6/1988 ... Kuhnel et al.
ments                         4,917,944 4/1990 ... Breitscheidel et al.--
(1449 sub. with IDS
dtd July 22, 1994)

Signed and Sealed this

Twenty-fifth Day of July, 1995

Attest:

BRUCE LEHMAN

Attesting Officer    Commissioner of Patents and Trademarks